United States Patent Office 3,426,106
Patented Feb. 4, 1969

3,426,106
PROCESS FOR PREPARING POLYMER MIXTURES CONTAINING A POLYVINYL HALOGENIDE
Jan W. H. Zijp, Geleen, and Wilhelmus J. M. M. Dullens, Brunssum, Netherlands, assignors to Stamicarbon N.V., Heerlen, Netherlands
No Drawing. Filed Mar. 23, 1966, Ser. No. 536,605
Claims priority, application Netherlands, Mar. 24, 1965, 6503709
U.S. Cl. 260—897
Int. Cl. C08f 29/24
7 Claims

ABSTRACT OF THE DISCLOSURE

A process for preparing a homogeneous mixture of 95–5 parts by weight of a polyvinyl halide or a copolymer thereof containing up to 20 moles percent of a copolymerizable monomer and 5–95 parts be weight of an ethylene copolymer containing 2–25 moles percent of a copolymerization monomer, the mixing being conducted at a temperature at which the ethylene copolymer is gelatinized and the polyvinyl halide remains as a powder, the temperature not exceeding 150° C.; the mixture may subsequently be heated to a temperature up to 180° C.

---

The present invention relates to a process for preparing a mixture of a polyvinyl halide and an ethylene copolymer.

It has beeen disclosed in the English patent specification 917,083 that polymer mixtures rich in polyvinyl chloride may be prepared by mixing 98–60% by weight of a polymer derived from vinyl chloride and from up to 20 moles percent of another copolymerizable comonomer, with 2–40 percent by weight of a copolymer derived from ethylene and a vinyl ester of certain carboxylic acids. The mixing of the polymers is preferably effected at a temperature of from 160 to 180° C., which is normally used for polyvinyl chloride, the large amount of polyvinyl chloride being first gelatinized and the smaller amount of ethylene copolymer being subsequently added thereto. An alternative procedure is to mix polymers of the said type by first mixing them manually or mechanically at room temperature and subsequently heating the solid polymer mixture at a temperature above the gelatinizing temperature of the polyvinyl chloride, which, depending upon the amount of comonomer of the polyvinyl chloride, is usually in the range of 150 to 160° C. As the polyvinyl chloride may decompose at about 180° C., the heating is carried out within the range of 150 to 180° C.

Applicants have found that the above-described mixing methods yield insufficiently homogeneous polymer mixtures containing a polyvinyl halide, whereby products are obtained in which the non-homogeneity can be perceived even with the unaided eye, which renders them unsuitable for most practical applications.

It is an object of the present invention to provide a process whereby homogeneous polymer mixtures containing a polyvinyl halide may be obtained so that the polymer mixture and the molded articles entirely or partly consisting thereof have a low-temperature brittle point which is appreciably lower than that of the unmixed polyvinyl halide. In addition, after the polymers have been mixed homogeneously, the polymer mixture can be processed more easily than the unmixed polyvinyl halide. Moreover, in contrast with mixtures containing a polyvinyl halide and the ususal plasticizer of low molecular weight, the present polymer mixtures are not subject to plasticizer migration. Further advantages will be discussed hereinafter.

The process according to the invention for preparing a mixture of a polyvinyl halide and an ethylene copolymer is characterized in that a dispersion, from which a homogeneous mixture can be obtained by heating at a temperature higher than the gelatinizing temperature of the polyvinyl halide, is prepared by mixing the polyvinyl halide as a powder with the ethylene copolymer at a temperature at which the ethylene copolymer is gelatinized and the polyvinyl halide remains powdery.

The term, "a polyvinyl halide," is here meant to include the homopolymers or copolymers of one or more vinyl halide, such as vinyl fluoride, vinyl bromide, and, preferably, vinyl chloride, and the copolymers of one or more vinyl halide with up to 20 moles percent of one or more other copolymerizable comonomers, e.g., vinylidene chloride, vinylidene bromide, vinylidene fluorobromide; vinyl esters, such as vinyl formate, vinyl acetate, vinyl butyrate, vinyl stearate, vinyl benzoate and vinyl pyridine; styrene; acrylic and α-alkyl-acrylic acids, such as methacrylic acid and ethacrylic acid; the nitriles, amides, esters, and inorganic salts to be formed from the above-mentioned acids, preferably the sodium salts; allyl compounds, such as allyl acetate and allyl chloride; allyl alkyl ethers, e.g., allyl ethyl ether, ethyl fumarate, and ethyl maleate.

The gelatinizing temperature of the powdery polyvinyl halide is the temperature at which the polyvinyl halide cannot be formed by kneading or milling into a continuous skin or mass.

The polyvinyl halide is considered to be powdery when the majority of the polymer particles have a diameter smaller than 0.5 mm. and preferably a diameter smaller than 0.1 mm.

An "ethylene copolymer" here denotes a copolymer consisting of ethylene and one or more copolymerizable comonomers, e.g., vinyl esters, such as vinyl acetate, vinyl butyrate, vinyl octoate, vinyl stearate and vinyl benzoate; vinyl ethers, such as ethyl vinyl ether and isobutyl vinyl ether, styrene; acrylic acid and α-alkyl acrylic acids, such as methacrylic acid and ethacrylic acid; the alkyl esters thereof, such as methyl acrylate, ethyl acrylate, 2-ethyl hexyl acrylate, octadecyl acrylate, methyl methacrylate and methyl ethacrylate, and the inorganic salts of the above-mentioned acids, which can be obtained in the usual way, e.g., by a high-pressure, a medium-pressure, or a low-pressure process. Use is preferably made of copolymers derived from 2–25 moles percent, preferably from 5–10 moles percent, of the comonomers. Copolymers of this type, in particular those of ethylene with vinyl esters, have many properties in common with a polyvinyl halide plasticized in the usual way, and in addition offer the advantages of a lower brittle temperature and a better processability, and do not show the disadvantages of plasticizer migration and embrittlement, the less desirable properties of the ethylene copolymer being completely or largely eliminated by the mixing with the polyvinyl halide.

The polymer mixture is considered to be homogeneous when, at room temperature, no boundary lines can be observed with the unaided eye in a 1.6 mm. thick plate pressed from the polymer mixture at 165° C., when light is transmitted through it.

According to the invention a powdery polyvinyl halide is dispersed in a softened ethylene copolymer, for instance, by adding the polyvinyl halide as if it were a filler to the ethylene copolymer softened on a heated roller. The softening temperature of the ethylene copolymer depends on the nature of and the ratio between the comonomers from which the ethylene copolymer is derived. Usually the softening temperature ranges between 70 and 130° C., so that the temperature is not higher than 150° C. in the dispersion process.

The time needed for the dispersion varies within wide limits, depending upon the mixing apparatus used, and may range, for instance between ½ and 20 minutes although a mixing time of less than 10 minutes will usually be sufficient to obtain a homogeneous polymer mixture upon heating at a temperature higher than the gelatinizing temperature of the polyvinyl halide.

The temperature of the dispersion consisting of a powdery polyvinyl halide in an ethylene copolymer and prepared according to the invention may be raised to over the gelatinizing temperature of the polyvinyl halide in a subsequent consecutive step in order to obtain a homogeneous polymer mixture containing the polyvinyl halide. If use is made of polyvinyl chloride as the polyvinyl halide, the temperature in this stage generally ranges between 160 and 180° C. Temperatures considerably higher than 180° C. are undesirable as a rule, as the polyvinyl chloride may then partially decompose. The gelatinizing temperature of the polyvinyl halide can be lowered by adding plasticizers conventionally used, such as dioctyl phthalate and tricresyl phosphate, to the polyvinyl halide, but such plasticizers are not necessary due to the presence of the ethylene copolymer.

It is not necessary to knead the polymer mixture in the subsequent heating step, but usually the polymer mixture will be subjected to a kneading process in order to obtain a product with the best possible properties.

The initial mixing of the polymers may be effected in any apparatus commonly used for this purpose, e.g., discontinuously in a Banbury mixer or an open roller; or continuously, for instance, with the aid of an extruder which is divided into two or more zones heated to a predetermined temperature. Preferably the extruder is divided into a number of zones of different temperature to obtain a temperature gradient along the extruder corresponding to the temperature of the polymer mixture in the extruder, which arrangement conserves heat.

During the mixing process conventional additives, such as antioxidents, UV-stabilizers, fillers, anti-blocking agents, and pigments, may be added to the polymer mixture. If so desired, the additives may be mixed separately with the polymers.

The polymer constituents of the dispersion may be mixed in various proportions depending upon the properties of the two polymers and on the desired properties of the final product. For example 95–5 parts by weight of the polyvinyl halide may be mixed with 5–95 parts by weight of the ethylene copolymer. Preferred ranges are from 95 to 50 parts by weight of the polyvinyl halide with 5 to 50 parts by weight of the ethylene copolymer. If so desired, the amounts used may be mixed at one time, but, if larger amounts of a polyvinyl halide, e.g., more than 50 parts by weight, are used, it is usually recommended to carry out the process according to the invention several times in succession. For instance, a mixture is first prepared consisting of 50 parts by weight of a polyvinyl halide and 50 parts by weight of an ethylene copolymer and, after the mixture is cooled to below the gelatinizing temperature of the polyvinyl halide, an amount of a polyvinyl halide is again added to this mixture. The process is repeated according to the invention until polymer mixtures very rich in a polyvinyl halide obtained.

If desired, the final product leaving the mixer may be given the shape of a sheet, a strand, or a bale.

If desired, the dispersion of the powdery polyvinyl halide in the ethylene copolymer obtained according to the invention may be cooled and delivered, either granulated or otherwise shaped, to users, who, by means of the usual processing apparatus, e.g., an extruder or an injection-moulding machine, can prepare therefrom products consisting of a homogeneous polymer mixture at temperatures higher than the gelatinizing temperature of the polyvinyl halide. The method described above offers the advantage that users can be supplied with a product which they can directly process on the processing equipment at their disposal without any additional ancillary equipment, e.g., mixing and kneading devices.

The properties of the dispersion of a powdery polyvinyl halide in an ethylene copolymer, to which dispersion conventional additives may have been added, depend on the constituents used. After the dispersion has been processed, the temperature being then raised to over the gelatinizing temperature of the polyvinyl halide, the homogeneous polymer mixture, which may have a particular shape, has the properties described above.

The polymer mixtures obtained in the process according to the invention, which consist entirely or partly of a polyvinyl halide and an ethylene copolymer and which have been heated to a temperature higher than the gelatinizing temperature of the polyvinyl halide, can be cross-linked in a very simple way by heating them together with conventional radical sources, e.g., dicumyl peroxide, at 120–180° C., preferably at 150–160° C.

The cross-linked polymer mixtures are excellent for use in the manufacture of technical articles, floor-covering, foot-wear, soles and heels.

Comparative examples (a) On a roller mill heated at 160° C., 0.2 kg. of the homopolymer of vinyl chloride was gelatinized, after which 0.2 kg. of a solid copolymer consisting of 93 moles percent of ethylene and 7 moles percent of vinyl acetate was added in small portions. After a mixing time of 10 minutes the polymer mixture was taken from the roller mill and cooled. The samples taken appeared to be non-homogeneous and were exceedingly brittle.

(b) The comparative example was repeated, but with the difference that the copolymer of ethylene was added to the gelatinized polyvinyl chloride in a softened condition, in which it was brought by heating on a roller mill at 100° C. After being mixed for 10 minutes, the polymer mixture appeared to be non-homogeneous. Neither was a homogeneous polymer mixture obtained after a mixing time of 40 minutes.

(c) While use was made of the same polymers as those used in the previous comparative examples, 0.2 kg. of the ethylene copolymer was softened on a roller mill heated at 100° C., after which 0.2 kg. of the polyvinyl chloride previously gelatinized on another mill at 160° C. was added, the temperature of the former roller mill being raised to 160° C. prior to addition. After being mixed for 30 minutes the polymer mixture was not homogeneous.

Example 1

While use was made of the same polymers as those used in the comparative examples, 0.2 kg. of the ethylene copolymer was softened on a roller mill heated at 100° C., after which 0.2 kg. of powdery polyvinyl chloride of room temperature was added in small portions in about 8 minutes. After 10 minutes mixing the temperature of the rollers was raised to 170° C. and mixing was continued for another 5 minutes. A sample of the resulting polymer mixture was homogeneous in composition.

Example 2

A copolymer consisting of 96 moles percent of ethylene and 4 moles percent of vinyl acetate was softened on a roller mill at about 100° C., after which 0.2 kg. of polyvinyl chloride, which was stabilized with 1% by weight of a stabilizer containing tin, was added in small portions. The polymers were mixed for about 10 minutes and the resulting dispersion was granulated. The subsequent extrusion, in which the temperature of the extruder head was 170° C., yielded products which had a homogeneous composition.

Example 3

Example 2 was repeated, but with this difference, that the ethylene copolymer used was a polymer consisting of 92 moles percent of ethylene and 8 moles percent of vinyl benzoate; again the resulting products were homogeneous in composition. As in the two previous examples, no boundary lines could be observed in a plate pressed from the polymer mixture, when this was viewed under a light microscope with a magnifying power of 75× while light was transmitted through the plate.

What is claimed is:

1. A process for preparing a mixture of a polyvinyl halide and an ethylene copolymer comprising
mixing (1) 95–5 parts by weight of a polyvinyl halide with (2) 5–95 parts by weight of an ethylene copolymer having a softening temperature in the range of 70–130° C., and which copolymer is gelatinized prior to addition of the polyvinyl halide to said copolymer;
said mixing being conducted at a temperature in the range of 70–150° C. at which the ethylene copolymer remains gelatinized and the polyvinyl halide remains as an unmelted powder;
and then heating said mixture to above the gelatinization temperature of said polyvinyl halide;
said polyvinyl halide being selected from the group consisting of polymers of one or more vinyl halides and copolymers of one or more vinyl halides with up to 20 mol. percent of at least one copolymerizable comonomer, and said ethylene copolymer being a copolymer of ethylene and 2–25 mol. percent of at least one copolymerizable comonomer selected from the group consisting of vinyl esters, vinyl ethers, acrylic acid and alpha-alkyl acrylic acids, the alkyl esters of acrylic acid and alpha-alkyl acrylic acids, and the inorganic salts of acrylic acid and alpha-alkyl acrylic acids.

2. The process according to claim 1 wherein the mixing of the powdered polyvinyl halide and the ethylene copolymer is effected at a temperature in the range of 70–130° C.

3. The process according to claim 1 wherein the mixing is effected for at least ½ minute.

4. The process according to claim 1 wherein the mixing is effected for 2–10 minutes.

5. The process according to claim 1 wherein the parts by weight of the polyvinyl halide is 95–50 and the parts by weight of the ethylene copolymer is 5–50.

6. The process according to claim 1 wherein the mixture is then heated to a temperature up to 180° C.

7. The process according to claim 1 wherein the polymer mixture obtained is cross-linked by heating with conventional free radical sources.

References Cited

UNITED STATES PATENTS

| 2,628,214 | 2/1953 | Pinkney et al. | 260—63 |
| 3,125,545 | 3/1964 | Van Cleve et al. | 260—897 |
| 3,188,305 | 6/1965 | Safford | 260—92.8 |
| 3,264,371 | 8/1966 | Gruber et al. | 260—897 |

FOREIGN PATENTS 917,083   1/1963   Great Britain.

SAMUEL H. BLECH, *Primary Examiner.*

C. J. SECCURO, *Assistant Examiner.*

U.S. Cl. X.R.

260—899